2,954,355

METHOD OF PREPARING ALKYD RESIN FROM ISOPHTHALIC ACID

Samuel Young, Jr., Park Forest, Ill., and Richard E. Van Strien, Griffith, Ind., assignors to Standard Oil Company, Chicago, Ill., a corporation of Indiana No Drawing. Filed May 28, 1957, Ser. No. 661,990

6 Claims. (Cl. 260—22)

This invention relates to the preparation of alkyd resins. More particularly, the invention relates to the elimination of operating difficulties caused by the use of isophthalic acid in the preparation of an alkyd resin.

The alkyld resins of commerce have been made almost exclusively with phthalic anhydride as the benzenecarboxylic acid component since this material has been readily available. Despite the fact that phthalic anhydride sublimes in appreciable quantity at alkyd resin reaction temperatures and condenses in the reflux condenser means attached to the reaction vessel, no serious problem has arisen with equipment plugging due to said sublimation, when a xylene solvent is present during the cooking. Very recently isophthalic acid has become available in commercial quantities and is being used as the sole benzenecarboxylic acid component, or in admixture with other benzenecarboxylic acids, in alkyd resins preparation. The vapor pressure of isophthalic acid is very much less than that of phthalic anhydride and theoretically much less isophthalic acid should sublime into the reflux condenser means; theoretically heat transfer and other problems should be less with the isophthalic acid than with phthalic anhydride. This is not true. It has been found that the presence of isophthalic acid in the alkyl resin reaction vessel introduces a very serious problem of reflux condenser means plugging. Even in the presence of a xylene solvent during the cook, the isophthalic acid forms a fluffy or puffy solid phase which bridges across the openings in the condenser means and effectively closes these to entry of vapors from the reaction vessel. A very, very small amount of isophthalic acid is sufficient to cause this blockage and the problem is serious even though a mixture of acids is being used of which isophthalic is only a minor component. As isophthalic acid does impart desirable characters to alkyd resins used for protective surface coating, manufacturer's wish to use this material but the operational difficulties do present such a problem that economic considerations of cleaning equipment have reduced the amount of isophthalic acid going into commercial alkyd resins.

An object of the invention is a process for preparing alkyd resins wherein isophthalic acid is one of the reactants, which process is not troubled with plugged reflux condenser means. A particular object is a process for preparing alkyd resins using isophthalic acid as one of the reactants which process is free from reflux condenser plugging through isophthalic acid condensation. Other objects will become apparent in the course of the detailed description.

It has been found that only tiny amounts of isophthalic acid need be introduced in the vapor form into a condenser in order to plug the condenser with a light fluffy or puffy solid phase, if water vapors are present simultaneously with the isophthalic acid vapors in the condensing zone. It appears that some sort of interaction takes place between the isophthalic acid and the water so that the solid phase condensing from the mixture of isophthalic acid vapor and water vapor forms a very fluffy expanded structure which occupies a great deal of space for its weight. In the absence of water vapor, isophthalic acid vapor condenses to form a thin dense film on the surface of the condenser.

It has been discovered that a solution of n-butanol and normally liquid benzene hydrocarbons is an excellent solvent for the puffy isophthalic acid solid phase and sweeps this solid phase easily from the reflux condenser means. The solution may be charged to the alkyd resin reaction vessel along with the reactants—preferably so. However, the solution may be added at any time that is helpful, i.e., at the time when solid phase formation is beginning to markedly reduce condensing capacity. If added at any time other than at the beginning, it is preferred to add the solution by way of the reflux condenser means, in order to dissolve and sweep the solid phase into the reaction vessel. Enough solution must be used to enable the maintenance of substantially solid phase-free condensing system. In general it has been found that the use of between about 2 and 5 weight percent of solution, based on reactants charged to the alkyd resin reaction vessel, is sufficient to give completely satisfactory operation of the reflux condenser system. The use of this solution, as defined herein, does not in any way harm the properties of the alkyd resin reaction product. Within the accuracy of the various characterization procedures there is no difference between alkyd resin prepared without solution usage and alkyd resin prepared with solution usage.

The solution used in the process of the invention consists of between about 25–65 volume percent of n-butanol and 75–35 volume percent of a normally liquid benzene hydrocarbon. Examples of suitable normally liquid benzene hydrocarbons are benzene, toluene, ethylbenzene, propylbenzene, t-butylbenzene, the xylene isomers, the trimethyl and ethylbenzene isomers, the tetramethylbenzene isomers, hexamethylbenzene and hexaethylbenzene. The $C_8$ and $C_9$ benzene hydrocarbons are particularly suitable. Although it is preferred to use n-butanol itself, mixtures of n-butanol and its isomers, such as isobutanol, may also be used. It is preferred to use a solution consisting of between about 25–35 volume percent n-butanol and 75–65 volume percent of a $C_8$ benzene hydrocarbon or mixtures therof.

It is to be understood that the invention may be utilized with any alkyd resin reaction wherein isophthalic acid is present in a substantial amount, i.e., enough to cause condenser difficulty. The invention is particularly useful when isophthalic acid is the major acid or the sole benzenecarboxylic acid present.

It is to be understood that the alkyd resin preparation in which the presence of the defined solution is useful may involve any of the well known components of alkyd resin reactions, particularly those which produce an oil modified alkyd resin.

The polyhydric alcohol component may be any one of the alcohols containing 2 or more hydroxyl groups, examples of suitable alcohols are: ethyleneglycol, diethyleneglycol, propyleneglycol, dipropyleneglycol, glycerol, trimethylol ethane, pentaerythritol, dipentaerythritol, sorbitol and mannitol.

The acid used may be any one of the polybasic acids. These acids are for example, phthalic acid, phthalic anhydride, trimesic, trimellitic trimellitic anhydride, hemimellitic, etc. It has been pointed out previously each of these acids will be used in admixture with isophthalic acid.

The oil-modified alkyd resins utilized in the reaction zone, one or more of the conventional vegetable oils and marine oils or the fatty acids derived from one of these oils or a single one of the various fatty acids. The vegetable oils which are commonly used for this purpose are: linseed, soybean, tung, castor, dehydrated castor, oiticica, cocoanut, cottonseed, rapeseed, perilla, corn, poppyseed, tall, safflower. The marine oils commonly used are: herring, sardine and menhaden.

These vegetable and marine oils are often classified as drying, semi-drying and non-drying oils. Linseed oil is an example of a commonly used drying oil; soybean oil is a typical semi-drying oil; and cottonseed is an example of a non-drying oil. The oils may be processed to obtain a mixture of fatty acids which are designated by the name of the source oil. For example, soya fatty acids are derived from soybean oil. The more or less pure individual fatty acids may also be utilized in the preparation of the composition. Commonly utilized fatty acids are: capric, lauric, myristic, palmitic, stearic, behenic, oleic, linoleic, linolenic, ricinoleic, erucic.

Any of the numerous conventional procedures for the preparation of oil-modified alkyd resins may be utilized. In general, the desired amount of the particular fatty acid or oil and the alcohol are charged to a reaction vessel and are heated to a temperature on the order of 180° C. to 230° C., the higher temperatures being utilized with the higher boiling point alcohols. A suitable catalyst such as lime or litharge is added and the reaction continued until the alcohol-oil product has a methanol compatibility of about 1:4. At this point, the desired benzene carboxylic acid is added and a reaction carried out at either the same temperature as the alcoholosis reaction or at a somewhat higher temperature up to about 300° C. The acid may be charged all at once or gradually over a period of time. The reaction is continued until the desired acid number and viscosity of the reaction product have been obtained.

The results obtainable with the process of the instant invention are compared with results obtained in identical reactions without the addition of solution and with the use of other alcoholic solutions. In the illustrative runs set out hereinafter the reactants were charged to a three-necked flask. In the alkyd resins of these examples the oil and the glycerol were charged to a flask equipped with a motor driven stirrer, a thermometer and a reflux condenser. Provision was made to maintain a nitrogen atmosphere in the flask. Calcium hydroxide or litharge was used as the alcoholysis catalyst. The reaction was continued until the oil-glycerol mixture had a methanol compatibility of about 1:4. At this point the acid was added and the reaction continued until the desired viscosity and acid number material was obtained.

The operating conditions of the various illustrative runs plus the product characterizations are set out in detail in the annexed table. The xylene used as the benzenehydrocarbon component of the solution in these runs consisted of a natural mixture of $C_8$ aromatic hydrocarbons. All of the alcohols used were essentially water free and substantially pure purchased products.

Run No. 1 was carried out as a blank without the presence of any solution. In this run the reflux condenser and water trap were completely plugged with a fluffy white solid phase which was shown to be isophthalic acid. Run No. 2 was carried out using 100% methanol as the alcohol member of the solution. 90 ml. of the solution was added to the reaction mixture. The results of this run showed that there was no significant difference between the condition of the condenser and water trap with respect to plugging and run No. 1. The fact that methanol is carried out of the system with the water discard from the water trap is believed to be the explanation for this result. Run No. 3 utilized n-propanol as the alcohol. There was a substantial reduction in the amount of plugging but not enough to justify the use of this alcohol in a commercial operation because considerable cleaning of the condenser and water trap would still be necessary at the end of the cook. In Run No. 4 wherein isopropanol was the alcohol the clean-up was no better than that using methanol in spite of the higher boiling point of the isopropanol.

Runs 10 and 11 utilized n-pentanol as the alcohol. The results show that variation of the percent n-pentanol present in the solution had no detectable influence on the amount of solid phase formation. However, when the larger amount of n-pentanol was present in run 11 the characteristics of the alkyd resin product were very markedly depreciated.

Runs 5 through 9 utilized a butanol as the alcohol

TABLE

Alcohol-xylene refluxing solution

[60% Soybean Oil Modified Alkyd]

| Run No. | 1 | 2 | 3 | 4 | 5 | 6 | 7 | 8 | 9 | 10 | 11 |
|---|---|---|---|---|---|---|---|---|---|---|---|
| Alcohol used | None | Methanol | n-propanol | isopropanol | n-butanol | n-butanol | n-butanol | n-butanol | isobutanol | n-pentanol | n-pentanol |
| Percent Alcohol in Solution | | 25 | 25 | 25 | 20 | 25 | 25 | 100 | 25 | 25 | 50 |
| Volume of solution, ml | 0 | 90 | 45 | 30 | 60 | 30 | 50 | 100 | 30 | 30 | 90 |
| Charge, gm.: | | | | | | | | | | | |
| Soybean Oil | 600 | 600 | 600 | 600 | 600 | 600 | 600 | 600 | 600 | 600 | 600 |
| Glycerol | 160 | 160 | 160 | 160 | 160 | 160 | 160 | 160 | 160 | 160 | 160 |
| Catalyst | 0.16 | 0.3 | 0.3 | 0.3 | 0.3 | 0.3 | 0.3 | 0.26 | 0.3 | 0.3 | 0.3 |
| Type | PbO | Ca(OH)$_2$ | Ca(OH)$_2$ | Ca(OH)$_2$ | Ca(OH)$_2$ | Ca(OH)$_2$ | Ca(OH)$_2$ | PbO | Ca(OH)$_2$ | Ca(OH)$_2$ | Ca(OH)$_2$ |
| Isophthalic Acid | 347 | 347 | 347 | 347 | 347 | 347 | 347 | 347 | 347 | 347 | 347 |
| Operating Conditions: | | | | | | | | | | | |
| Alcoholysis, Temp., °C | 232 | 232 | 232 | 232 | 232 | 232 | 232 | 232 | 232 | 232 | 232 |
| Duration, Hr | ¾ | ¾ | ¾ | ¾ | ¾ | ¾ | ¾ | ¾ | ¾ | ¾ | ¾ |
| Alkyd Cook, Temp., °C | 232 | 232 | 232 | 232 | 232 | 232 | 232 | 232 | 232 | 232 | 232 |
| Duration, Hr | 4¼ | 3⅔ | 3½ | 3½ | 3½ | 3¾ | 4¼ | 4 | 3½ | 3½ | 3½ |
| Product: | | | | | | | | | | | |
| Viscosity (60% N.V.): | | | | | | | | | | | |
| (Gardner) | Z6 | Z6 | Z5–Z6 | Z4–5 | Z2–3 | Z3 | Z6 | K–L | Z4–Z5 | Z3 | Y |
| (Poises) | 148 | 148 | 130 | 80 | 41 | 46 | 146 | 2.9 | 80 | 46 | 17.6 |
| Acid Number | 13.4 | 10.7 | 12.8 | 15.8 | 9.4 | 12.1 | 10.7 | 10.0 | 14.0 | 13.7 | 7.7 |
| Color (60% N.V.) | 6 | 5–6 | 5 | 6 | 5 | 5 | 5 | 7 | 6 | 5 | 5 |
| Cure, Sec | 24 | 47 | 28 | 31 | 41 | 39 | 42 | 164 | 30 | 46 | 72 |
| Results: | | | | | | | | | | | |
| Effect in Reducing IPA deposits | | Poor | Fair | Poor | Fair | Good | Good | Excellent | Fair | Fair | Fair |
| Effect on Alkyd | | None | None | None | None | None | None | Bad | None | None | Bad |
| Film Properties: | | | | | | | | | | | |
| Set to Touch, Hrs | ⅔ | | ½ | ¾ | | 1⅙ | 1¼ | 2 | ¾ | 1¼ | |
| Set to Cotton, Hrs | 1¼ | | 1 | 1 | | 1½ | 1⅔ | 4 | 1 | 1¾ | |
| Tack Free Paper, Hrs | 5 | | 5½ | 5½ | | 6 | 5⅔ | Over night | 5¼ | 5¼ | |
| Sward Hardness: | | | | | | | | | | | |
| 1 Day | 1 | | 4 | 4 | | 2 | 0 | 0 | 4 | 2 | 1 |
| 1 Week | 9 | | 10 | 10 | | 10 | 6 | 0 | 10 | 8 | | component. Runs 5 through 8 used n-butanol as the alcohol component. Run No. 5 used a solution containing 20% of n-butanol in an amount of 60 ml. charged to the reactor. In this run the condition of the condenser system could be described only as fair. In Run No. 6 wherein only one-half as much solution was used but the amount of n-butanol present was increased to 25 volume percent the condenser system and water trap and were substantially free of solid phase. Increasing the amount of solution to 50 ml. at the same n-butanol concentration in run No. 7 does not appreciably change the condition of the condenser system and water trap. In runs 5, 6 and 7 the presence of the n-butanol did not in any way change the characteristics of the alkyd resin product with respect to the product of run No. 1. In run No. 8 wherein n-butanol alone was used as the refluxing solution the water trap and condenser system were completely free of solid phase but the characteristics of the alkyd resin produce were very badly depreciated.

In run No. 9 the alcohol was isobutanol used in the same concentration and amount as in run No. 6, however, surprisingly the condition of the condenser system and water trap could be described only as fair in this run. Apparently the small difference in boiling point and water solubility between the n-butanol and the isobutanol is significant enough to show a difference in the ability to remove the isophthalic acid solid phase from the condenser system and water trap. However, the results of runs 5 through 9 are such that reasonably satisfactory performance can be obtained when using a mixture of butanols as the alcohol component. The results of these runs clearly show a large advantage in favor of the use of the butanols and particularly n-butanol as the alcohol component of the alcohol-benzenehydrocarbon solution for reducing and even eliminating the plugging of reflux system by sublimed isophthalic acid.

We claim:

1. In the process of preparing alkyd resins wherein (I) a polyhydric alcohol selected from the class consisting of ethyleneglycol, diethyleneglycol, propyleneglycol, dipropyleneglycol, glycerol, trimethylol ethane, pentaerythritol, dipentaerythritol, sorbitol and mannitol and (II) a benzenecarboxylic acid selected from the class consisting of (1) isophthalic acid and (2) mixtures of isophthalic acid and an acid selected from the group consisting of phthalic acid, phthalic anhydride, trimesic acid, trimellitic acid, trimellitic anhydride and hemimellitic acid, wherein said isophthalic acid is the major component of said mixture, are reacted at a temperature on the order of 180° C. to 300° C., while continuously removing water produced in the reaction and returning condensed reactants to said reaction zone by way of a reflux condenser means, until the acid number and viscosity desired for the alkyd resin product have been obtained and wherein said reflux means would become substantially plugged, over the course of the reaction time, by the formation therein of a fluffy solid phase comprising isophthalic acid, the improvement whereby said plugging is essentially eliminated by carrying out said reaction in the presence of a solution consisting of between about 25–65 volume percent of n-butanol and 75–35 volume percent of normally liquid benzene hydrocarbon, said solution being present in an amount between about 2 and 5 weight percent based on reactants charged to said reaction zone, whereby said alkyd resin reaction is enabled to be carried out with the aforesaid reflux condenser means maintained substantially free of the aforesaid fluffy solid phase.

2. The process of claim 1 wherein said solution is introduced into said reaction zone substantially simultaneously with said reactants.

3. The process of claim 1 where said hydrocarbon is xylene.

4. The process of claim 1 where said hydrocarbon is ethylbenzene.

5. The process of claim 1 wherein said solution consists of between about 25–35 volume percent n-butanol and 75–65 volume percent of $C_8$ benzene hydrocarbon.

6. The process of claim 1 wherein said reactants include a member selected from the class consisting of vegetable oil, marine oil and fatty acids derivable from said oils and said alcohol and said member are reacted at a temperature between about 180° C.–230° C. for the time needed to obtain a product having the desired methanol compatability and this alcoholysis reaction product is then further reacted with said benzenecarboxylic acid.

References Cited in the file of this patent

UNITED STATES PATENTS

| 2,061,635 | Sandig | Nov. 24, 1936 |
| 2,530,144 | Bannon | Nov. 14, 1950 |

FOREIGN PATENTS

| 414,665 | Great Britain | Aug. 7, 1934 |